US011748046B2

(12) United States Patent
Uno et al.

(10) Patent No.: US 11,748,046 B2
(45) Date of Patent: *Sep. 5, 2023

(54) COMMUNICATION DEVICE TO SET OPERATION MODE TO FIRST MODE OR SECOND MODE FOR RECEIVING TARGET DATA FROM SPECIFIC SERVER AND NON-TRANSITORY COMPUTER-READABLE RECORDING MEDIUM STORING COMPUTER-READABLE INSTRUCTIONS

(71) Applicant: BROTHER KOGYO KABUSHIKI KAISHA, Nagoya (JP)

(72) Inventors: Akihito Uno, Mizuho (JP); Tomomi Shiraki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,253

(22) Filed: Sep. 21, 2021

(65) Prior Publication Data

US 2022/0100446 A1   Mar. 31, 2022

(30) Foreign Application Priority Data

Sep. 28, 2020   (JP) .................................. 2020-162444

(51) Int. Cl.
  *G06F 3/12*   (2006.01)
  *G06F 3/06*   (2006.01)
  *G06K 15/00*   (2006.01)

(52) U.S. Cl.
  CPC .......... *G06F 3/1238* (2013.01); *G06F 3/1204* (2013.01); *G06F 3/1226* (2013.01);
  (Continued)

(58) Field of Classification Search
  None
  See application file for complete search history.

(56) References Cited

U.S. PATENT DOCUMENTS 10,210,437 B2 *   2/2019   Takasu ................. G06F 3/1212
2009/0086270 A1 *   4/2009   Miyazawa ............ G06F 3/1286
                                    358/1.15

(Continued)

FOREIGN PATENT DOCUMENTS

JP   2012-187866 A   10/2012

*Primary Examiner* — Haris Sabah
(74) *Attorney, Agent, or Firm* — Scully, Scott, Murphy & Presser, PC

(57) ABSTRACT

A communication device may set an operation mode of the communication device to a first mode, the first mode being for repeatedly sending a polling signal to a specific server on the Internet so as to receive target data from the specific server. The communication device may receive a response including related information which is related to the target data from the specific server, and receive a response not including the related information from the specific server. The communication device may set the operation mode of the communication device to a second mode instead of the first mode in a case where a first predetermined condition is satisfied in a state where the operation mode of the communication device is the first mode, wherein the second mode is for receiving the target data from the specific server without sending the polling signal to the specific server.

9 Claims, 9 Drawing Sheets

(52) U.S. Cl.
CPC .......... *G06F 3/1231* (2013.01); *G06F 3/1288* (2013.01); *G06F 3/0634* (2013.01); *G06K 15/4055* (2013.01)

(56) References Cited

U.S. PATENT DOCUMENTS

| | | | |
|---|---|---|---|
| 2010/0073713 A1* | 3/2010 | Chae | ........................ G06F 16/93 709/204 |
| 2012/0229844 A1 | 9/2012 | Yada et al. | |
| 2013/0258384 A1* | 10/2013 | Kanoh | .................. G06F 3/1212 358/1.13 |
| 2020/0213456 A1* | 7/2020 | Matsumoto | ........... G06F 3/1224 |

\* cited by examiner

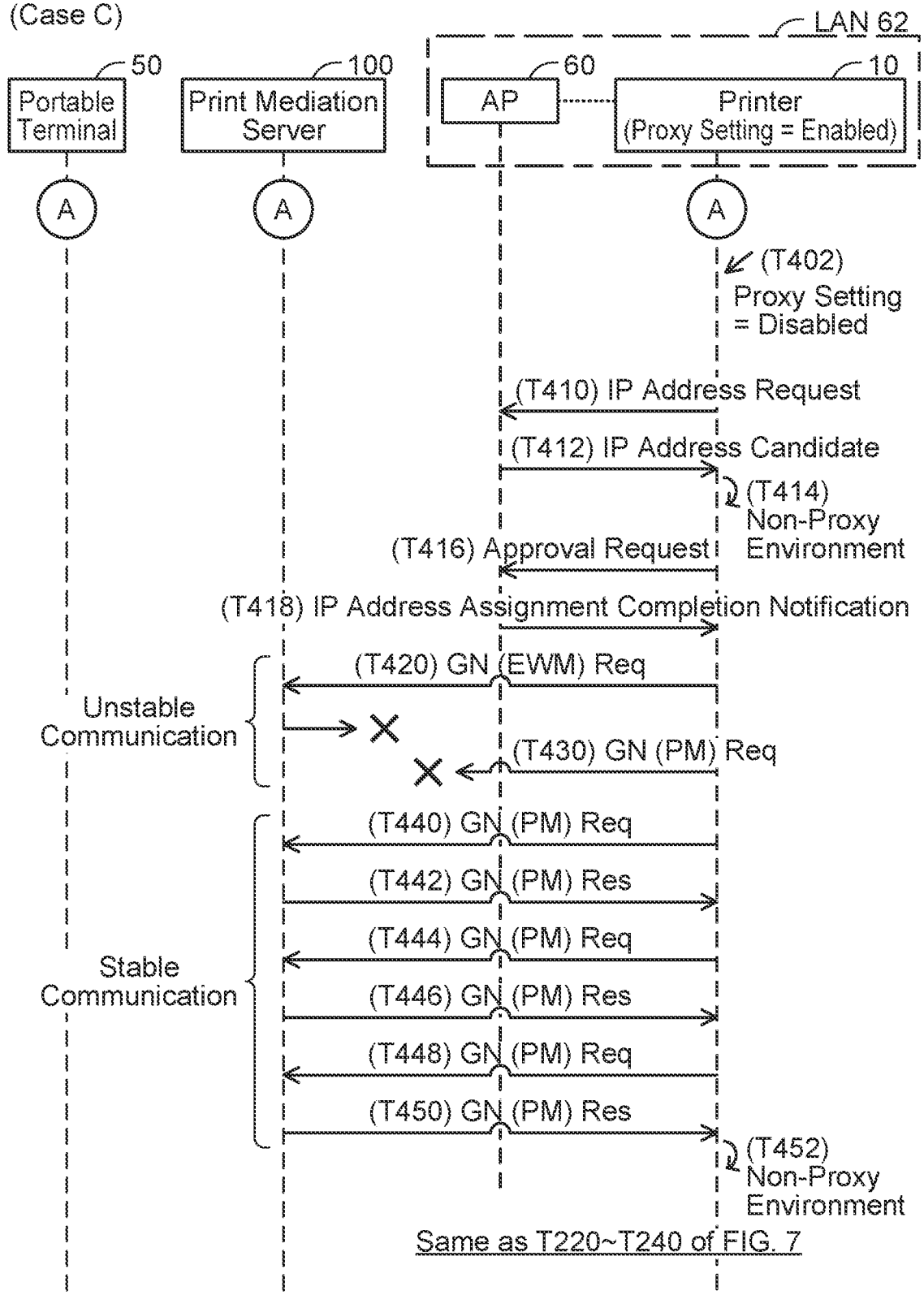

COMMUNICATION DEVICE TO SET OPERATION MODE TO FIRST MODE OR SECOND MODE FOR RECEIVING TARGET DATA FROM SPECIFIC SERVER AND NON-TRANSITORY COMPUTER-READABLE RECORDING MEDIUM STORING COMPUTER-READABLE INSTRUCTIONS

CROSS-REFERENCE

This application claims priority to Japanese Patent Application No. 2020-162444, filed on Sep. 28, 2020, the entire contents of which are incorporated herein by reference.

TECHNICAL FIELD

The disclosure herein discloses art related to a communication device configured to execute communication with a server on the Internet.

BACKGROUND ART

A printer capable of printing in accordance with Google Cloud Print (GCP) is known. In this printer, in the case where an Extensible Messaging and Presence Protocol (XMPP) connection is established with a print mediation server (hereinbelow termed "XMPP mode"), the printer receives a notification related to printing from the print mediation server upon when a print job is created by the print mediation server without periodically sending a polling signal to the print mediation server. When connection with the print mediation server becomes weak while the printer is operating in the XMPP mode, the printer closes its XMPP stream and shifts to a state of periodically sending the polling signal to the print mediation server (hereinbelow termed "polling mode"). If the print mediation server already has the print job when the printer sends the polling signal, the printer receives the notification related to printing from the print mediation server.

SUMMARY

As aforementioned, in the XMPP mode, the notification as above is sent from the print mediation server to the printer when the print job is created by the print mediation server without the polling signal being periodically sent from the printer to the print mediation server. On the other hand, in the polling mode, the notification as above is not sent from the print mediation server to the printer in a period from when the print job was created in the print mediation server until when the polling signal is sent from the printer to the print mediation server. Due to this, as compared to the XMPP mode, the printer may execute printing after a long period of time has elapsed since the print job was created.

The disclosure herein provides art that may enable a communication device to promptly receive target data from a specific server.

A communication device disclosed herein may comprise: a controller, wherein the controller is configured to: set an operation mode of the communication device to a first mode, the first mode being for repeatedly sending a polling signal to a specific server on the Internet so as to receive target data from the specific server; in a case where the polling signal is received by the specific server in a state where the specific server has the target data, receive a response including related information which is related to the target data from the specific server; in a case where the polling signal is received by the specific server in a state where the specific server does not have the target data, receive a response not including the related information from the specific server; in a case where a first predetermined condition is satisfied in a state where the operation mode of the communication device is the first mode, set the operation mode of the communication device to a second mode instead of the first mode, wherein the first predetermined condition includes receiving at least one response from the specific server, and the second mode is for receiving the target data from the specific server without sending the polling signal to the specific server; and in a case where the target data is obtained by the specific server in a state where the operation mode of the communication device is the second mode, receive the related information from the specific server.

A method executed by the communication device is also novel and useful. Further, a system that comprises the aforementioned communication device and specific server is also novel and useful.

BRIEF DESCRIPTION OF DRAWINGS

FIG. 9 is a sequence diagram of Case C in which communication between the printer and the print mediation server becomes unstable.

EMBODIMENT (Configuration of Communication System 2; FIG. 1)

As shown in FIG. 1, a communication system 2 includes a printer 10, a portable terminal 50, a plurality of access points 60, 70A, and a print mediation server 100. The printer 10 is configured to selectively join one of a Local Area Network (LAN) 62 in which the access point (hereinbelow termed "AP" as abbreviation of Access Point) 60 operates as a parent station and a LAN 72 in which the AP 70A operates as a parent station. The print mediation server 100 is connected to the Internet 6. When the printer 10 belongs to the LAN 62 or the LAN 72, it can execute communication with the print mediation server 100 via corresponding one of the AP 60 and the AP 70A. In a variant, the LAN 62 and the LAN 72 may each be a wired LAN instead of a wireless LAN. When the portable terminal 50 belongs to the LAN 62 or the LAN 72, it can execute communication with the printer 10 and the print mediation server 100 via corresponding one of the AP 60 and the AP 70A. In a variant, the portable terminal 50 may execute communication with the print mediation server 100 using cellular communication such as 3G, 4G, and 5G.

(Configuration of Printer 10)

Figure 1:
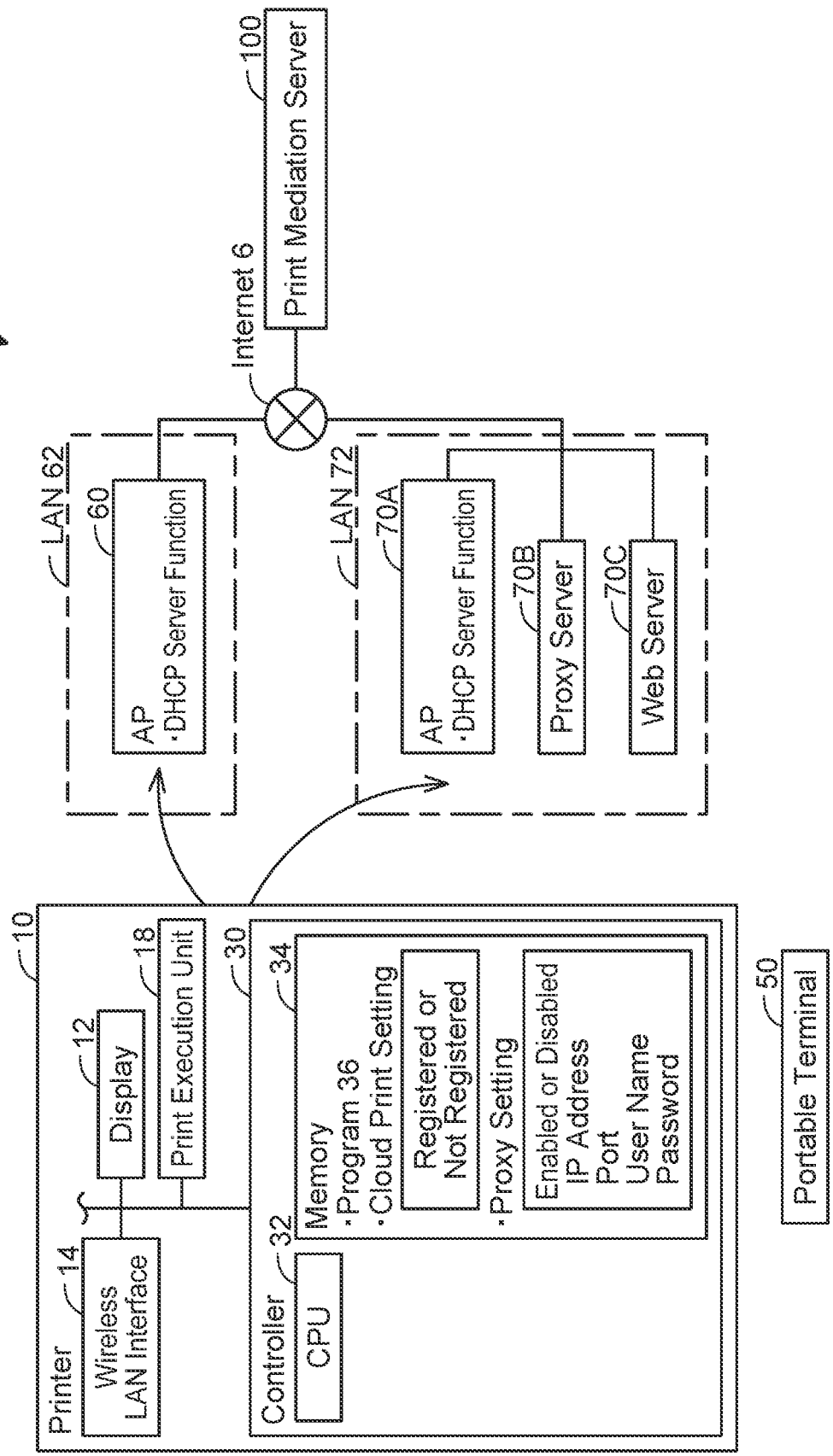
FIG. 1 shows a configuration of a communication system.

The printer 10 is a peripheral device (e.g., a peripheral device of the portable terminal 50) capable of executing a print function. In the present embodiment, the printer 10 is a portable printer (so-called mobile printer). As such, a user can bring the printer 10 close to the AP 60 or the AP 70A and cause the printer 10 to selectively join the LAN 62 or the LAN 72.

The printer 10 includes a display 12, a wireless LAN interface 14, a print execution unit 18, and a controller 30. The respective modules 12 to 30 are connected to a bus line (reference sign omitted). Hereinbelow, an interface will be termed simply "I/F".

The display 12 is a display configured to display various types of information. The display 12 also functions as a so-called touch screen (operation unit to be operated by the user). The wireless LAN I/F 14 is a wireless I/F for executing wireless communication according to a Wi-Fi standard. Specifically, the wireless LAN I/F 14 is configured to establish a wireless connection with one of the AP 60 and the AP 70A. Due to this, the printer 10 can belong to the LAN 62 or the LAN 72. The print execution unit 18 is a print mechanism of an inkjet scheme, a laser scheme, or the like.

The controller 30 includes a CPU 32 and a memory 34. The CPU 32 is configured to execute various processes according to a program 36 stored in the memory 34. The memory 34 is configured of a volatile memory, a nonvolatile memory, and the like. The memory 34 stores, in addition to the aforementioned program 36, a cloud print setting and a proxy setting. The cloud print setting indicates a value that is one of "registered", meaning that information related to the printer 10 is registered in the print mediation server 100, and "not registered", meaning that this information is not registered therein. When this information is registered in the print mediation server 100, the printer 10 can use a cloud print service provided by the print mediation server 100. In the present embodiment, the cloud print service is Universal Print (UP) service provided by Microsoft (registered trademark). The cloud print service may be any print service provided via the Internet, and may for example be Google (registered trademark) Cloud Print (GCP) service.

The proxy setting includes flag information that indicates a value indicating one of "enabled", indicating that a proxy server 70B is to be used, and "disabled", indicating that the proxy server 70B is not to be used. The proxy setting may further include a plurality of setting values for using the proxy server 70B. The flag information and the plurality of setting values are inputted by the user. The plurality of setting values includes an IP address of the proxy server 70B, a port number to be used for communication with the proxy server 70B, a user name, and a password.

(Configurations of APs 60, 70)

Each of the APs 60, 70A has a Dynamic Host Configuration Protocol (DHCP) server function. As such, the AP 60 can assign an IP address to a device belonging to the LAN 62, and the AP 70A can assign an IP address to a device belonging to the LAN 72. The LAN 72 established by the AP 70A further has the proxy server 70B and a web server 70C therein.

(Configuration of Portable Terminal 50)

The portable terminal 50 may for example be a portable terminal device such as a portable phone, a smartphone, a PDA, and a tablet PC. In a variant, a stationary PC or a notebook PC may be used instead of the portable terminal 50. Hereinbelow, the portable terminal 50 will be termed "terminal 50".

(Configuration of Print Mediation Server 100)

The print mediation server 100 is a server configured to provide the cloud print service. The print mediation server 100 in the present embodiment is not a server installed by a vendor of the printer 10 but is a server installed by a business entity that provides the cloud print service. In a variant, the print mediation server 100 may be the server installed by the vendor of the printer 10. The print mediation server 100 is configured to convert image data received from the portable terminal 50, for example, to generate print data, and send this print data to the printer 10. Hereinbelow, the print mediation server 100 will be termed "server 100".

Figure 2:
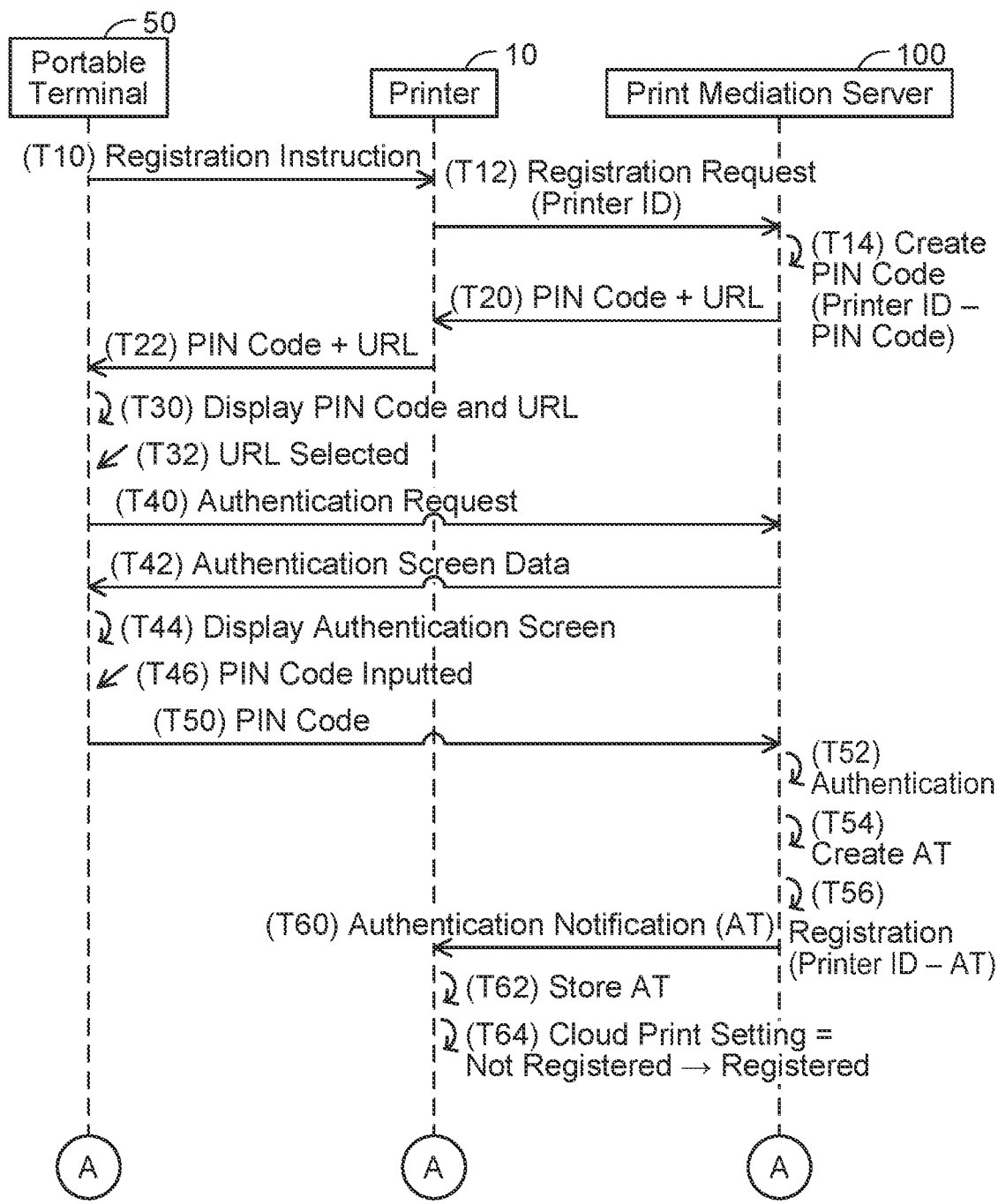
FIG. 2 is a sequence diagram of a process to register information related to a printer in a print mediation server.

(Registration Process: FIG. 2)

A process for registering the information related to the printer 10 in the server 100 in order for the printer 10 to use the cloud print service provided by the server 100 will be described with reference to FIG. 2. In an initial state of FIG. 2, the printer 10 and the terminal 50 belong to the same LAN (i.e., LAN 62 or LAN 72). When the printer 10 belongs to the LAN 62, the printer 10 executes communication with the terminal 50 and the server 100 using the AP 60. When the printer 10 belongs to the LAN 72, the printer 10 executes communication with the terminal 50 and the server 100 using the AP 70A, and also executes communication with the print mediation server 100 by further using the proxy server 70B and the web server 70C. However, in FIG. 2, illustrations of the AP 60, the AP 70A, and the servers 70B, 70C are omitted. In sequence diagrams from FIG. 6 as well, illustrations of these devices are omitted unless otherwise mentioned.

Hereinbelow, in explaining processes which the CPU 32 of the printer 10 executes according to the program 36, they may be described with the printer 10 as a subject of action instead of describing the CPU 32 as the subject of action. Further, each and every communication executed hereinbelow by the printer 10 is executed via the wireless LAN I/F 14. As such, hereinbelow, in explaining processes related to communication, the phrase "via the wireless LAN I/F 14" will be omitted.

In response to accepting an operation by the user, the terminal 50 accesses for example a web server in the printer 10. Then, in response to accepting an operation by the user for the printer 10 to receive the cloud print service, the terminal 50 sends a registration instruction to the printer 10 in T10.

In receiving the registration instruction from the terminal 50 in T10, the printer 10 sends a registration request including a printer ID being information for identifying the printer 10 to the server 100 in T12.

In receiving the registration request from the printer 10 in T12, the server 100 creates a PIN code in T14 and stores the printer ID included in the registration request and the created PIN code in association with each other. Then, in T20, the server 100 sends the PIN code and a login Uniform Resource Locator (URL) to the printer 10. The login URL is information indicating a location of authentication screen data in the server 100 to be described later.

In receiving the PIN code and the URL from the server 100 in T20, the printer 10 sends the same to the terminal 50 in T22.

In receiving the PIN code and the URL from the printer 10 in T22, the terminal 50 displays the same in T30. Then, in T32, when an operation of selecting the URL by the user is accepted, the terminal 50 sends an authentication request including the URL to the server 100 in T40.

In receiving the authentication request from the terminal 50 in T40, the server 100 sends, to the terminal 50, the authentication screen data identified by the URL included in the authentication request in T42. The authentication screen data is data representing an authentication screen for inputting a PIN code.

In receiving the authentication screen data from the server 100 in T42, the terminal 50 displays the authentication screen represented by the authentication screen data in T44. Next in T46, the terminal 50 accepts an input of the PIN code displayed in T30 from the user. In this case, the terminal 50 sends the inputted PIN code to the server 100 in T50.

In receiving the PIN code from the terminal 50 in T50, the server 100 executes authentication of the received PIN code in T52. Specifically, the server 100 determines whether the received PIN code is already stored. In the case where the server 100 determines that the received PIN code is already stored, that is, in the case where the authentication is successful, the server 100 creates an access token being a unique character string (hereinbelow termed "AT" (as abbreviation of Access Token)" in T54. Then, in T56, the server 100 stores the printer ID and the created AT in association with each other, and sends an authentication notification including the created AT to the printer 10 in T60.

In T62, the printer 10 causes the memory 34 to store the AT included in the authentication notification. In this case, the printer 10 changes the cloud print setting from "not registered" to "registered" in T64. As a result of the above, the registration process is terminated.

Figure 3:
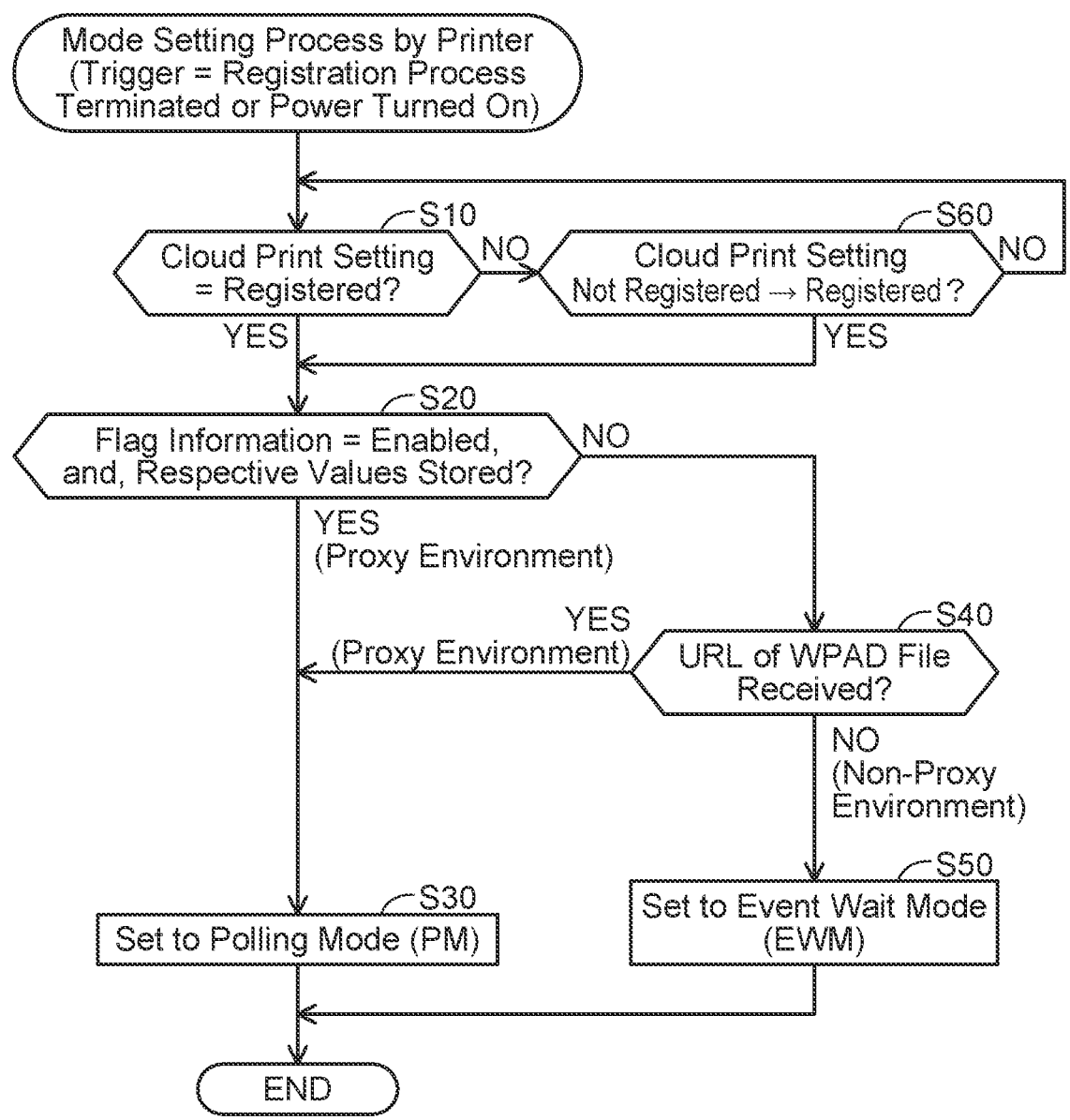
FIG. 3 is a flowchart of a mode setting process.

(Mode Setting Process by Printer: FIG. 3)

Next, a mode setting process executed by the CPU 32 of the printer 10 will be described with reference to FIG. 3. The process of FIG. 3 is started with either the registration process being terminated or power of the printer 10 being turned on as its trigger.

In S10, the CPU 32 determines whether the cloud print setting is "registered". The CPU 32 proceeds to S20 in the case where the cloud print setting is "registered" (YES in S10), while proceeds to S60 in the case where the cloud print setting is "not registered" (NO in S10).

In S60, the CPU 32 monitors the cloud print setting being changed from "not registered" to "registered" (i.e., the process of T64 of FIG. 2 being executed). The CPU 32 determines YES in S60 in the case where the cloud print setting is changed, and proceeds to the process of S20.

The processes of S20 and S40 are a series of processes for determining whether the printer 10 is in a proxy environment or a non-proxy environment. The proxy environment is an environment in which the printer 10 may execute communication with devices on the Internet 6 using the proxy server 70B (i.e., a situation where the printer 10 belongs to the LAN 72). The non-proxy environment is an environment in which the printer 10 executes communication with the devices on the Internet 6 without using the proxy server 70B (i.e., a situation in which the printer 10 belongs to the LAN 62). Especially, the printer 10 executes the above determination when the power is turned on (trigger of the process of FIG. 3) or in the case where the cloud print setting is changed from "not registered" to "registered" (YES in S60). Thus, the printer 10 can execute the determination as above at a suitable timing when it is about to join a LAN.

In S20, the CPU 32 checks the proxy setting in the memory 34, and determines whether the flag information indicates "enabled" and the respective setting values (IP address, port number, etc.) are stored. The CPU 32 determines that the printer 10 is in the proxy environment (YES in S20) in the case where the flag information indicates "enabled" and the respective setting values are stored, and proceeds to S30. On the other hand, the CPU 32 proceeds to S40 in the case where the flag information indicates "disabled", or in the case where the flag information indicates "enabled" but the respective setting values are not stored (NO in S20). Since the printer 10 executes the determination of S20 based on the proxy setting, the printer 10 can suitably determine whether it is in the proxy environment or not.

In S30, the CPU 32 sets an operation mode of the printer 10 to a Polling Mode (hereinbelow termed "PM"). The PM is a mode for repeatedly sending a polling signal to the server 100 and receiving print data from the server 100. When S30 is completed, the process of FIG. 3 is terminated.

In S40, the CPU 32 determines whether a URL of a Web Proxy Auto-Discovery Protocol (WPAD) file is stored in the memory 34. Here, WPAD will be described. When the printer 10 joins the LAN 62 or the LAN 72, it requests corresponding one of the AP 60 and the AP 70A to assign an IP address. Since the AP 60 and the AP 70A have the DHCP server function, they can automatically assign an IP address to the printer 10. When the proxy server 70B exists on the LAN 72, the AP 70A sends the URL of the WPAD file to the printer 10 upon assigning the IP address to the printer 10. The WPAD file is a file indicating information related to the proxy server 70B. As such, when the printer 10 receives the URL of the WPAD file from the AP 70A, the printer 10 can determine that the proxy server 70B is on the LAN 72, that is, the printer 10 is in the proxy environment.

In the case where the printer 10 belongs to the LAN 72, since the URL of the WPAD file is already received from the AP 70A, the CPU 32 determines that the printer 10 is in the proxy environment (YES in S40) and proceeds to the process of S30. On the other hand, in the case where the printer 10 belongs to the LAN 62, since the URL of the WPAD file is not received from the AP 60, the CPU 32 determines that the printer 10 is not in the proxy environment (i.e., is in the non-proxy environment) (NO in S40) and proceeds to the process of S50. Since the printer 10 executes the determination of S40 based on presence/absence of receipt of the URL of the WPAD file, the printer 10 can suitably determine whether it is in the proxy environment.

In S50, the CPU 32 sets the operation mode of the printer 10 to an Event Wait Mode (hereinbelow termed "EWM"). The EWM is a mode for receiving print data from the server 100 without sending the polling signal to the server 100. When S50 is completed, the process of FIG. 3 is terminated.

As above, the printer 10 operates in the PM when it is in the proxy environment while operates in the EWM when it is in the non-proxy environment. As a result of the study conducted by the inventors, it has been discovered that when the printer 10 operates in the EWM in the case where it is in the proxy environment, a phenomenon occurred in which the printer 10 cannot receive, from the server 100, a notification indicating that the print data has been created (hereinbelow termed "receipt failing phenomenon"). According to the present embodiment, since the printer 10 operates in the PM instead of the EWM in the case where it is in the proxy environment, occurrence of the receipt failing phenomenon can thereby be prevented. As above, the printer 10 can operate in a suitable mode according to whether it is in the proxy environment.

As aforementioned, the printer 10 can selectively operate in one of the PM and the EWM. Although details will be described later, in the PM, in the case where the print data is already in the server 100 when the polling signal is sent from the printer 10 to the server 100, the printer 10 receives a Job-ID from the server 100 and thereafter receives the print data. In the EWM, when the print data is created by the server 100, the printer 10 receives the Job-ID from the server 100 within a relatively short period of time, and thereafter receives the print data. As such, the printer 10 may receive the print data at an earlier timing when it is operating in the EWM than when it is operating in the PM.

Figure 4:
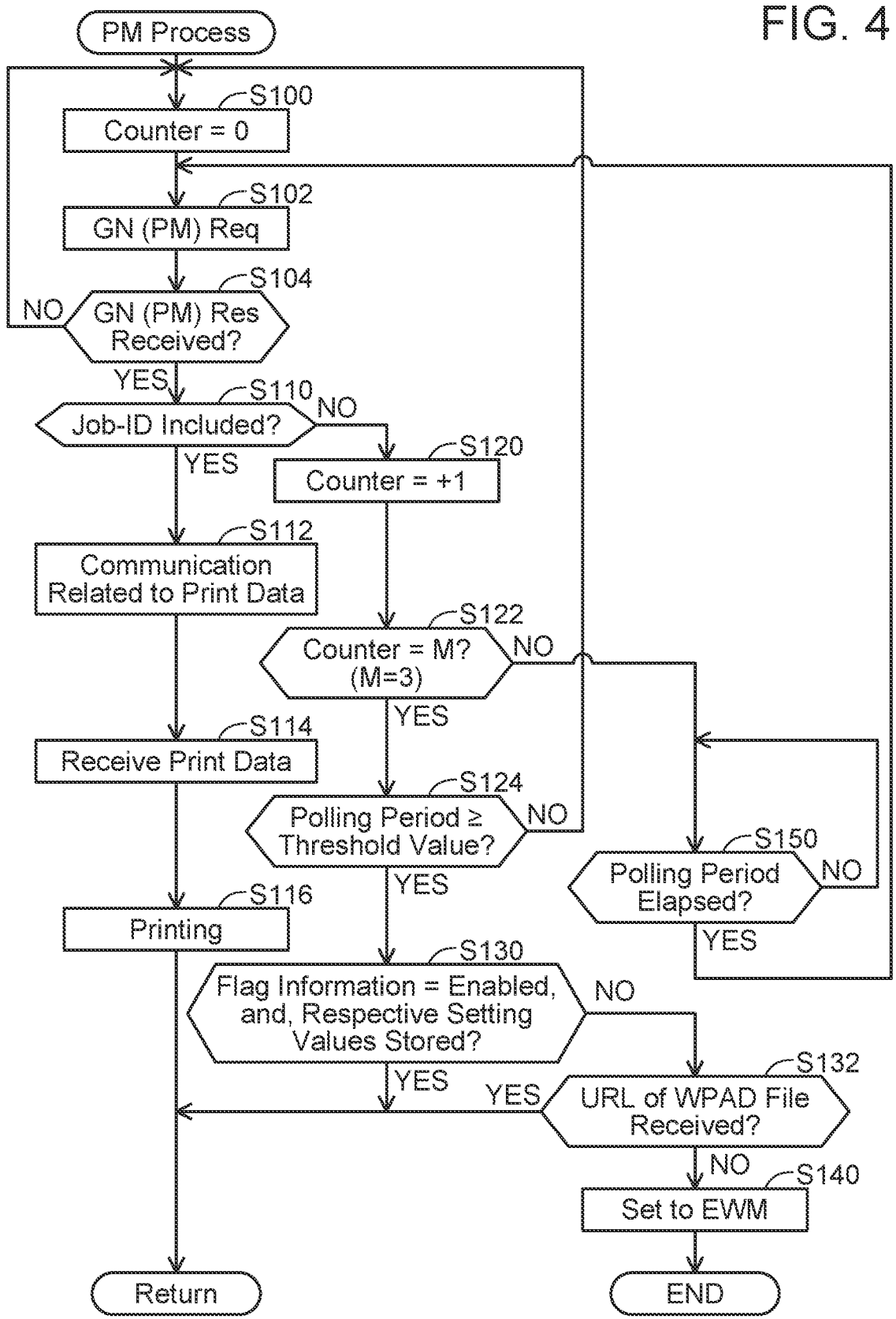
FIG. 4 is a flowchart of a Polling Mode process.

(PM Process: FIG. 4)

Next, the process executed by the CPU 32 in the state where the printer 10 is operating in the PM will be described with reference to FIG. 4.

In S100, the CPU 32 sets a counter to zero. The counter is for counting how many times a Get-Notification (Polling Mode) Response (hereinbelow termed "GN(PM)Res") sent from the server 100 was received.

In S102, the CPU 32 sends a Get-Notification (Polling Mode) Request (hereinbelow termed "GN(PM)Req") to the server 100. The GN(PM)Req is a polling signal for checking with the server 100 whether the print data has been created. In response to this, in the case where the print data representing an image which the printer 10 is to print (i.e., a print job) has already been created, the server 100 sends the GN(PM)Res including the Job-ID being information for identifying this print data to the printer 10. On the other hand, in the case where the print data has not yet been created, the server 100 sends the GN(PM)Res not including the Job-ID to the printer 10.

In S104, the CPU 32 determines whether the GN(PM)Res has been received from the server 100. The CPU 32 determines YES in S104 in the case where the GN(PM)Res has been received from the server 100, and proceeds to S110. In the case where a predetermined time elapses without receiving the GN(PM)Res from the server 100, the CPU 32 determines NO in S104 and proceeds to S100. For example, in the case where the printer 10 has unstable communication, NO may be determined in S104.

In S110, the CPU 32 determines whether the received GN(PM)Res includes a Job-ID. The CPU 32 proceeds to S112 in the case where it determines that the GN(PM)Res includes a Job-ID (YES in S110), while proceeds to S120 in the case where it determines that the GN(PM)Res does not include a Job-ID (NO in S110).

In S112, the CPU 32 executes communication related to the print data with the server 100. This communication includes sending a Fetch-job Request to the server 100, receiving a Response from the server 100, and sending a Fetch-Document Request to the server 100.

In S114, the CPU 32 receives the print data from the server 100. Specifically, the CPU 32 receives the print data (i.e., Document) from the server 100 in response to sending the Fetch-Document Request to the server 100.

In S116, the CPU 32 prints the image represented by the received print data. When S116 is completed, the CPU 32 returns to S100.

In S120, the CPU 32 increments the counter by 1. In S122, the CPU 32 determines whether a value of the counter is M. M in the present embodiment is 3, however, it may be 2 or 4 or more in variants. The CPU 32 proceeds to S124 in the case where it determines that the value of the counter is M (YES in S122), while proceeds to S150 in the case where it determines that the value of the counter is not M (NO in S122).

In S150, the CPU 32 determines whether a polling period has elapsed. The polling period is a period (e.g., 30 seconds) indicated by period information included in the GN(PM)Res. When the polling period as above elapses since when the GN(PM)Res was received from the server 100, the CPU 32 determines YES in S150 and returns to S102. That is, the CPU 32 resends the GN(PM)Req to the server 100 (S102) when the polling period elapses since when the GN(PM)Res was received (YES in S150). As above, the CPU 32 sends the GN(PM)Req to the server 100 each time the polling period designated by the server 100 elapses.

In S124, the CPU 32 determines whether the polling period is equal to or longer than a predetermined threshold value. The threshold value in the present embodiment is 30 seconds, however, it may be shorter than or longer than 30 seconds. The CPU 32 proceeds to S130 in the case where it determines that the polling period is equal to or longer than the threshold value (YES in S124), while returns to S100 in the case where it determines that the polling period is shorter than the threshold value (NO in S124). That is, the printer 10 maintains the PM without shifting to the EWM when the polling period is shorter than the threshold value. When the polling period is shorter than the threshold value, the GN(PM)Res is sent in a relatively short cycle, so the printer 10 can receive the print data from the server 100 at a relatively early timing. Due to this, the PM is maintained without shifting to the EWM in which the aforementioned receipt failing phenomenon could occur.

Figure 5:
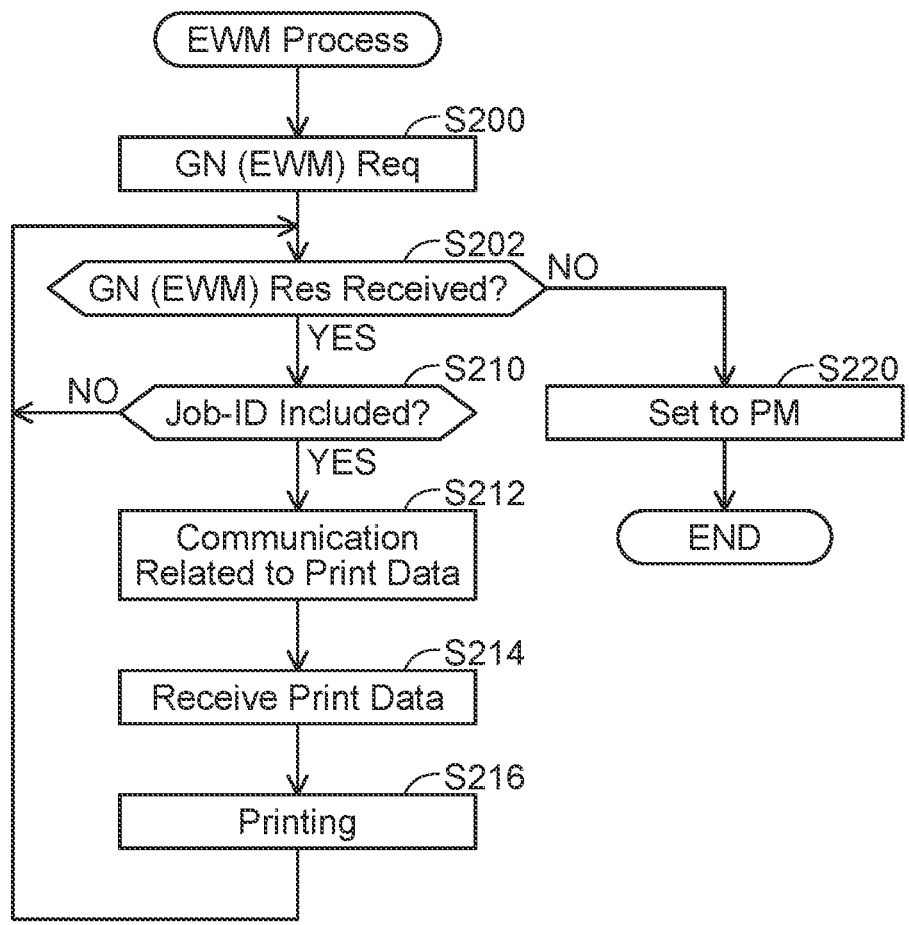
FIG. 5 is a flowchart of an Event Wait Mode process.

Processes of S130 and S132 are the same as S20 and S40 of FIG. 3. In the case of YES in S130 or S132, that is, in the case where the printer 10 is in the proxy environment, the PM is maintained and the CPU 32 returns to S100. In the case of NO in S132, that is, in the case where the printer 10 is in the non-proxy environment, the CPU 32 changes the operation mode of the printer 10 from the PM to the EWM in S140. Here, the CPU 32 changes the operation mode of the printer 10 from the PM to the EWM before the polling period elapses since when the GN(PM)Res was received. As such, the printer 10 can shift promptly to the EWM. When S140 is completed, the process of FIG. 4 is terminated, and the process of FIG. 5 is started. As aforementioned, when receiving the GN(PM)Res not including the Job-ID for M consecutive times, the printer 10 determines whether the printer 10 is in the proxy environment. As such, the printer 10 can execute the determination as above at a suitable timing when communication with the server 100 is stable.

According to such a configuration, the printer 10 shifts to the EWM when receiving the GN(PM)Res not including the Job-ID for M consecutive times in the state where the operation mode of the printer 10 is in the PM, that is, when communication with the server 100 is stable. By operating in the EWM, the printer 10 can promptly receive the Job-ID from the server 100 as compared to the case where the printer 10 operates in the PM, thus the printer 10 can promptly receive the print data from the server 100.

Further, the printer 10 executes the process related to printing (S112 to S116) when receiving the GN(PM)Res including the Job-ID. If the process to shift the mode is executed in parallel to the printing process, processing load on the printer 10 becomes high, and speed of the process related to printing could be slowed down. To avoid this, in the present embodiment, the printer 10 does not shift to the EWM when receiving the GN(PM)Res including the Job-ID (YES in S110). Due to this, the printer 10 can promptly execute printing.

(EWM Process: FIG. 5)

Next, the process executed by the CPU 32 in the state where the printer 10 is operating in the EWM will be described with reference to FIG. 5.

In S200, the CPU 32 sends a Get-Notification (Event Wait Mode) Request (hereinbelow termed "GN(EWM)Req") to the server 100. The GN(EWM)Req is a signal for requesting the server 100 to send a notification to the printer 10 when print data is created. Due to this, when the server 100 creates the print data representing the image to be printed by the printer 10, it sends a Get-Notification (Event Wait Mode) Response (hereinbelow termed "GN(EWM)Res") including the Job-ID to the printer 10. On the other hand, each time a predetermined standby time elapses without creating any print data, the server 100 sends the GN(EWM)Res not including the Job-ID to the printer 10. This predetermined standby time may for example be 60 seconds.

In S202, the CPU 32 determines whether the GN(EWM) Res has been received from the server 100. The CPU 32 determines YES in S202 and proceeds to S210 in the case where it has received the GN(EWM)Res. In the case where the aforementioned standby time elapses without receiving the GN(EWM)Res, the CPU 32 determines NO in S202 and proceeds to S220. For example, when the printer 10 has unstable communication, determination of NO may be made in S202.

In S210, the CPU 32 determines whether the received GN(EWM)Res includes the Job-ID. The CPU 32 proceeds to S212 in the case it determines that the GN(EWM)Res includes the Job-ID (YES in S210), while returns to S202 in the case where it determines that the GN(EWM)Res does not include the Job-ID (NO in S210).

S212 to S216 are the same as S112 to S116 of FIG. 4. When S216 is completed, the CPU 32 returns to the process of S202.

In S220, the CPU 32 changes the operation mode of the printer 10 from the EWM to the PM. When S220 is completed, the process of FIG. 5 is terminated and the process of FIG. 4 is started.

Figure 6:
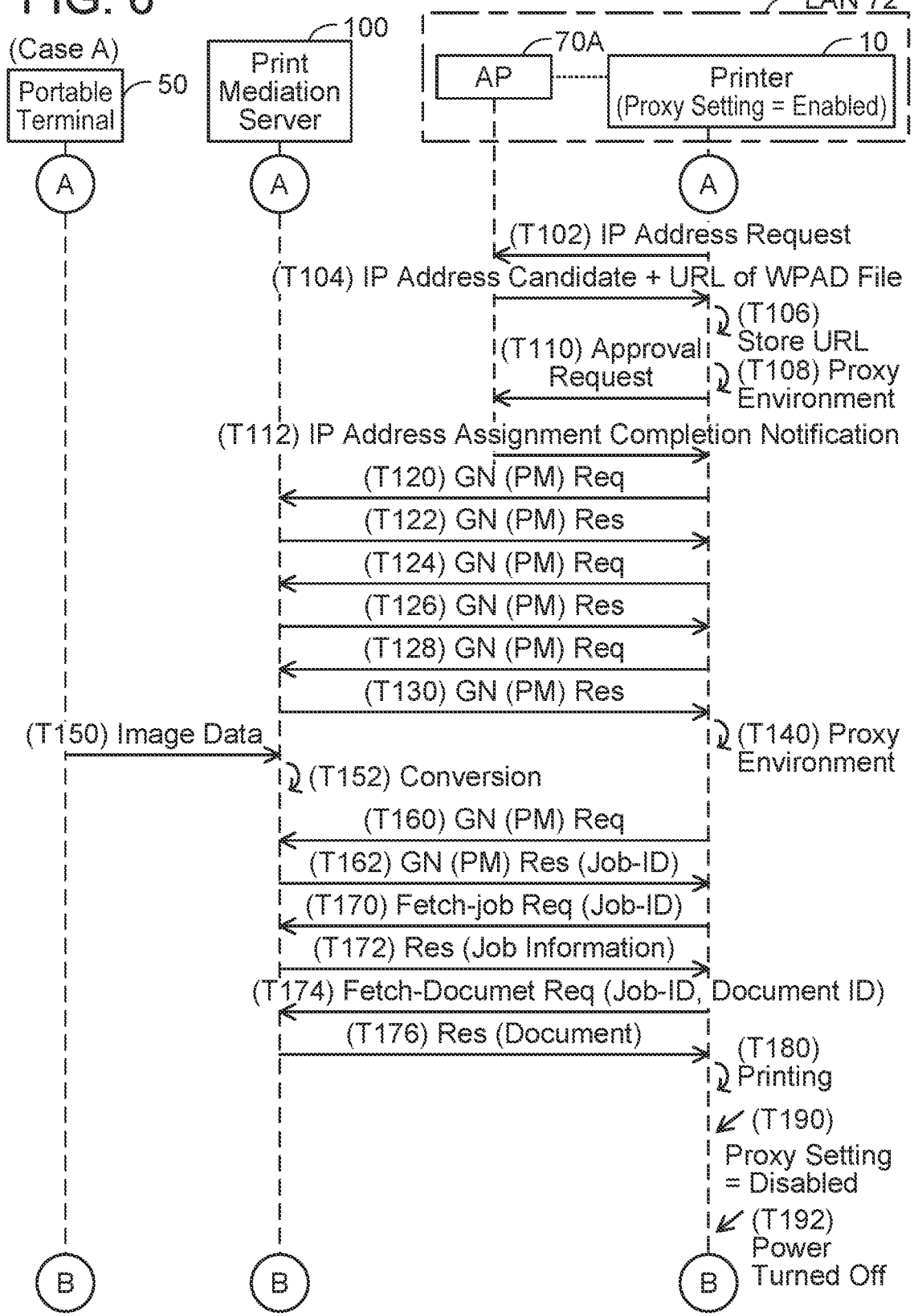
FIG. 6 is a sequence diagram of Case A in which the printer operates in a Polling Mode.

(Case A: FIG. 6)

Next, specific Cases A to C implemented by the processes of FIGS. 3 to 5 will be described with reference to FIGS. 6 to 9. Firstly, Case A will be described with reference to FIG. 6. FIG. 6 is continued from FIG. 2. As such, the cloud print setting of the printer 10 is "registered" (see T64 of FIG. 2). Further, in the proxy setting of the printer 10, the flag information indicates "enabled" and the respective setting values are stored.

The printer 10 belongs to the LAN 72 established by the AP 70A and sends an IP address request to the AP 70A in T102. In this case, the printer 10 receives a candidate of the IP address to be set in the printer 10 and the URL of the WPAD file from the AP 70A in T104. In T106, the printer 10 stores the received URL in the memory 34.

Since the printer 10 has the flag information indicating "enabled" and stores the respective setting values in the proxy setting, it determines in T108 that the printer 10 is in the proxy environment (YES in S20). As such, the printer 10 operates in the PM (S30).

Next, in T110, the printer 10 sends an approval request of the IP address to the AP 70A, and receives an assignment completion notification of the IP address from the AP 70A in T112.

In T120, the printer 10 sends the GN(PM)Req to the server 100 (S102 of FIG. 4) and receives the GN(PM)Res not including the Job-ID from the server 100 in T122 (YES in S104). The printer 10 determines that the received GN(PM)Res does not include the Job-ID (NO in S110), and as a result of this the value of the counter becomes 1 (S120, NO in S122).

When the polling period indicated by the period information included in the GN(PM)Res received in T122 elapses (YES in S150), the printer 10 resends the GN(PM)Req to the server 100 in T124 (S102). Then, as with the aforementioned process, T126 to T130 are executed and 3 is stored as the value of the counter (YES in S122).

When the value of the counter becomes 3, the printer 10 determines the value of the counter is equal to or greater than 3. Then, the printer 10 determines the polling period included in the GN(PM)Res received in T130 is equal to or longer than the threshold value (YES in S124). Then, since the flag information indicates "enabled" and the respective setting values are stored in the proxy setting (YES in S130), the printer 10 determines in T140 that the printer 10 is in the proxy environment. As aforementioned, if the printer 10 operates in the EWM in the case where the printer 10 is in the proxy environment, the aforementioned receipt failing phenomenon could occur. Due to this, when determining as being in the proxy environment, the printer 10 maintains the operation mode of the printer 10 in the PM. As a result, occurrence of the aforementioned receipt failing phenomenon can be prevented. In the present embodiment, the printer 10 determines whether it is in the proxy environment (S130 and S132) in the case where the polling period is equal to or longer than the predetermined threshold value (YES in S124). In a variant, the printer 10 may determine whether the polling period is equal to or longer than the predetermined threshold value after having determined whether it is in the proxy environment. That is, S124 may be executed between S132 and S140. In this variant, the PM is maintained without shifting to the EWM in the case where the polling period is equal to or shorter than the predetermined threshold value.

In response to accepting an instruction from the user, the terminal 50 sends image data to the server 100 in T150.

In receiving the image data from the terminal 50 in T150, the server 100 converts the received image data and creates print data having a data format that can be interpreted by the printer 10 in T152.

The printer 10 sends the GN(PM)Req to the server 100 in T160 (S102) and receives the GN(PM)Res including the Job-ID from the server 100 in T162 (YES in S104). In this case, the printer 10 determines that the GN(PM)Res includes the Job-ID (YES in S110).

Next, the printer 10 executes the communication related to the print data in T170 to T176 (S112, S114). Specifically, the printer 10 sends the Fetch-job Req including the Job-ID to the server 100 in T170 and receives the Res including Job information from the server 100 in T172. Then, the printer 10 sends the Fetch-Document Req to the server 100 in T174 and receives the Res including the print data from the server 100 in T176. Then, in T180, the printer 10 prints the image represented by the print data.

After this, in T190, the printer 10 changes the flag information included in the proxy setting from "enabled" to "disabled" in response to accepting an instruction from the user. Then in T192, the power of the printer 10 is turned off.

Figure 7:
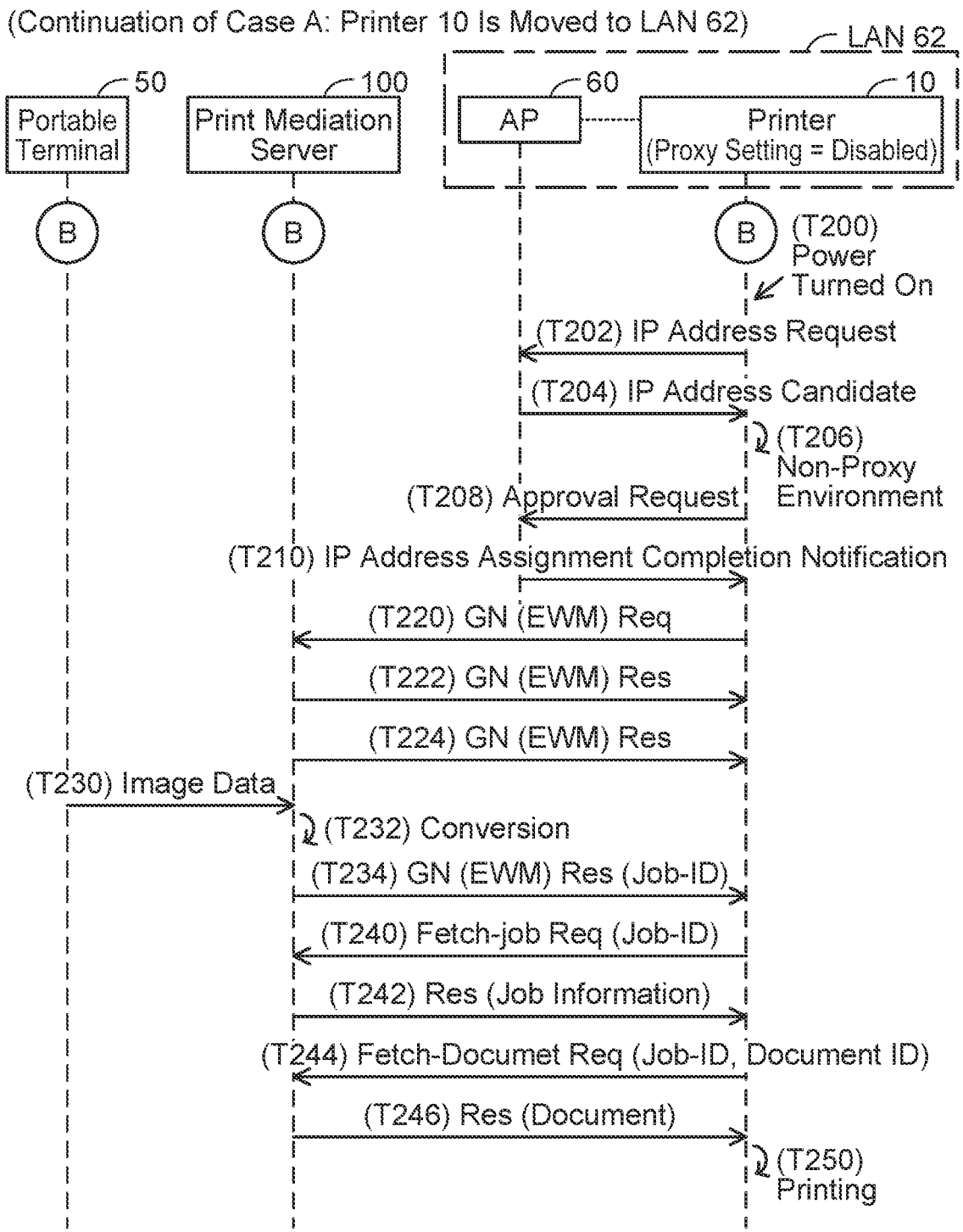
FIG. 7 is a sequence diagram continued from FIG. 6.

(Continuation of FIG. 6: FIG. 7)

Next, processes continued from Case A of FIG. 6 will be described with reference to FIG. 7. As such, in the proxy setting of the printer 10, the flag information indicates "disabled" (see T190 of FIG. 6).

After the process of FIG. 6 is terminated, the printer 10 is brought close to the AP 60 by the user. Then, when the power of the printer 10 is turned on in T200 (trigger of the process of FIG. 3), the printer 10 joins the LAN 62 established by the AP 60 and sends an IP address request to the AP 60 in T202. In this case, the printer 10 receives a candidate of the IP address from the AP 60 in T204. Here, upon joining the LAN 62 instead of the LAN 72, the printer 10 deletes the URL of the WPAD file received from the AP 70A of the LAN 72 from the memory 34. Then, the printer 10 does not receive the URL of the WPAD file from the AP 60.

Since the flag information in the proxy setting indicates "disabled" (NO in S20) and the URL of the WPAD file has not been received (NO in S40), the printer 10 determines in T206 that the printer 10 is in the non-proxy environment. As such, the printer 10 operates in the EWM (S50).

Next, the printer 10 sends an approval request of the IP address to the AP 60 in T208, and receives an assignment completion notification of the IP address from the AP 60 in T210.

The printer 10 sends a GN(EWM)Req to the server 100 in T220 (S200 of FIG. 5) and repeatedly receives a GN(EWM)Res not including a Job-ID from the server 100 in T222 and T224 (YES in S202, NO in T210).

In T230, the terminal 50 sends image data to the server 100 in response to accepting an instruction from the user.

In receiving the image data from the terminal 50 in T230, the server 100 converts the received image data and creates print data having a data format that can be interpreted by the printer 10 in T232. As a result, the server 100 sends a GN(EWM)Res including the Job-ID to the printer 10.

In receiving the GN(EWM)Res including the Job-ID from the server 100 in T234 (YES in S202, YES in S210), the printer 10 executes the communication related to the print data in T240 to T246 (S212, S214). Processes of T240 to T246 are the same as T170 to T176 of FIG. 6 except that the printer 10 communicates with the server 100 via the AP 60 instead of the AP 70A. Then, in T250, the printer 10 prints the image represented by the print data.

As described above, in Case A, the printer 10 shifts from the state of operating in the PM to the state of operating in the EWM. Due to this, the printer 10 can receive the Job-ID from the server 100 in a relatively short period of time since when the print data was created by the server 100. As a result, the printer 10 can promptly receive the print data from the server 100.

Figure 8:
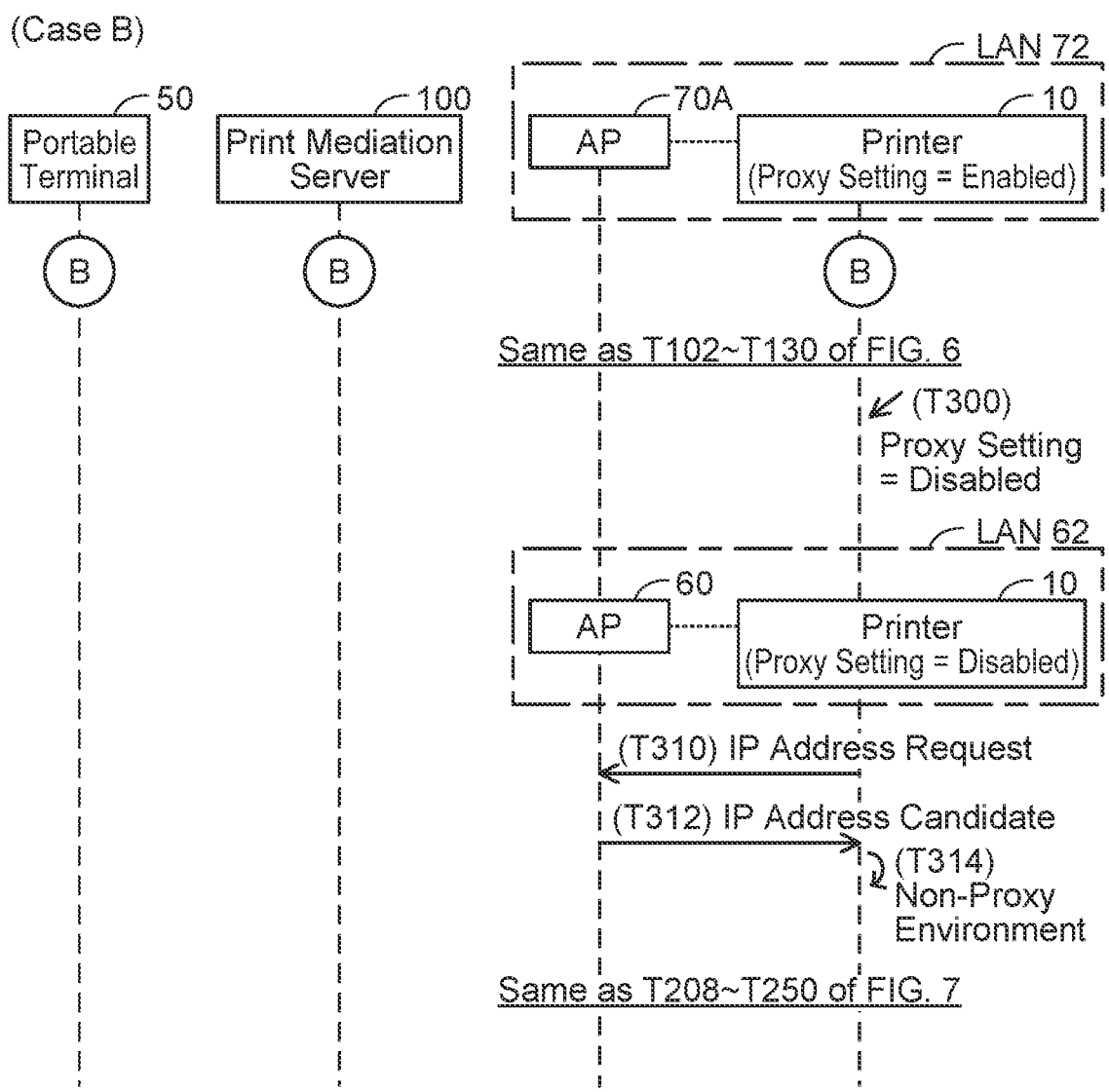
FIG. 8 is a sequence diagram of Case B in which a proxy setting of the printer is switched and a LAN to which the printer belongs is switched.

(Case B: FIG. 8)

Next, Case B will be described with reference to FIG. 8. FIG. 8 is a process continued from FIG. 2. As such, the cloud print setting of the printer 10 is "registered" (see T64 of FIG. 2). Further, in the proxy setting of the printer 10, the flag information indicates "enabled" and the respective setting values are stored.

As with T102 to T130 of FIG. 6, the printer 10 stores the URL of the WPAD file and operates in the PM. In T300, the printer 10 changes the flag information included in the proxy setting from "enabled" to "disabled" in response to accepting an instruction from the user.

After this, the printer 10 is brought close to the AP 60 by the user. The printer 10 joins the LAN 62 established by the AP 60, and sends an IP address request to the AP 60 in T310. In this case, the printer 10 receives a candidate of the IP address from the AP 60 in T312. Here, upon joining the LAN 62 instead of the LAN 72, the printer 10 deletes the URL of the WPAD file from the memory 34 as with the above case.

The printer 10 determines that the flag information indicates "disabled" in the proxy setting (NO in S20) and determines that it has not received the URL of the WPAD file (NO in S40). Due to this, the printer 10 determines that the printer 10 is in the non-proxy environment in T314. As such, the printer 10 operates in the EWM (S50) and executes the same processes as T208 to T250 of FIG. 7.

As described above, in Case B, the printer 10 shifts from the state of operating in the PM to the state of operating in the EWM. Due to this, the printer 10 can receive a Job-ID from the server 100 in a relatively short period of time since when print data was created by the server 100. As a result, the printer 10 can promptly receive the print data from the server 100.

(Case C: FIG. 9)

Next, Case C will be described with reference to FIG. 9. FIG. 9 is a process continued from FIG. 2. As such, the cloud print setting of the printer 10 is "registered" (see T64 of FIG. 2). Further, in the proxy setting of the printer 10, the flag information indicates "enabled" and the respective setting values are stored.

In T402, the printer 10 changes the flag information included in the proxy setting from "enabled" to "disabled" in response to accepting an instruction from the user.

The printer 10 joins the LAN 62 established by the AP 60, and sends an IP address request to the AP 60 in T410. In this case, the printer 10 receives a candidate of the IP address from the AP 60 in T412.

Since the flag information indicates "disabled" in the proxy setting (NO in S20) and the printer 10 has not received the URL of the WPAD file (NO in S40), it determines that the printer 10 is in the non-proxy environment in T414. As such, the printer 10 operates in the EWM (S50).

Next, the printer 10 sends an approval request of the IP address to the AP 60 in T416, and receives an assignment completion notification of the IP address from the AP 60 in T418.

The printer 10 sends a GN(EWM)Req to the server 100 in T420 (S200 of FIG. 5). The printer 10 determines that communication between the printer 10 and the server 100 is unstable in the case where a predetermined standby time (e.g., 60 seconds) elapses without receiving a GN(EWM)Res from the server 100 (NO in S202). In this case, the printer 10 changes the operation mode from the EWM to the PM (S220).

When operating in the EWM, the printer 10 cannot recognize whether its communication is stable or unstable until the predetermined standby time (e.g., 60 seconds) elapses. On the other hand, when operating in the PM, the printer 10 can recognize that the communication is stable by sending a GN(PM)Req and receiving a GN(PM)Req, and can recognize that the communication is unstable when the printer 10 does not receive a GN(PM)Req. That is, when the printer 10 is operating in the PM, it can promptly identify when the state of communication has been changed from being unstable to being stable. Due to this, when determining that communication is unstable, the printer 10 changes its operation mode from the EWM to the PM.

In T430, the printer 10 sends a GN(PM)Req to the server 100 (S102). In the case where the predetermined time that is set in advance elapses without receiving a GN(PM)Res from the server 100 (NO in S104), the printer 10 determines that communication between the printer 10 and the server 100 is unstable, maintains the counter at zero (S100), and resends a GN(PM)Req to the server 100 in T440 (S102).

After this, the printer 10 executes communication of T442 to T450 including receiving the GN(PM)Res, and recognizes that communication between the printer 10 and the server 100 has changed from being unstable to being stable (YES in S122). Then, in T452, the printer 10 determines that the printer 10 is in the non-proxy environment (NO in S132). After this, the printer 10 shifts again to the EWM (S140) and executes the same processes as T220 to T240 of FIG. 7. Due to this, the printer 10 can receive the Job-ID from the server 100 within a relatively short period of time since when the print data was created by the server 100. As a result, the printer 10 can promptly receive the print data from the server 100.

(Corresponding Relationship)

The printer 10 and the server 100 are respectively an example of "communication device" and "specific server". The PM and the EWM are respectively an example of "first mode" and "second mode". The GN(PM)Req and the GN(EWM)Res are respectively an example of "polling signal" and "predetermined signal". The Job-ID is an example of "related information". The GN(PM)Res including the Job-ID and the GN(PM)Res not including the Job-ID are respectively an example of "response including related information" and "response not including related information". The print data is an example of "target data". Determination of YES in S122 of FIG. 4 is an example of "a case where a first predetermined condition is satisfied". Determination of NO in S202 of FIG. 5 is an example of "a case where a second predetermined condition is satisfied". The polling period and the standby time are respectively an example of "first predetermined period" and "second predetermined period".

S30 of FIG. 3 and S220 of FIG. 5 are an example of "set an operation mode of the communication device to a first mode". YES in S104 and YES in S110 of FIG. 4, and T162 of FIG. 6 are examples of "receive a response including related information". YES in S104 and NO in S110 of FIG. 4, and T122, T126, and T130 of FIG. 6 are examples of "receive a response not including the related information". S50 of FIG. 3, S140 of FIG. 4, and T220 of FIG. 7 are examples of "set the operation mode of the communication device to a second mode instead of the first mode". YES in S202 and YES in S210 of FIG. 5, and T234 of FIG. 7 are examples of "receive the related information". YES in S202 of FIG. 5 is an example of "receive a predetermined signal".

(Variant 1) In T122 of FIG. 4, M may be 1. That is, the "first predetermined condition" may be satisfied when one polling signal is received. Further, in another variant, the "first predetermined condition" may be satisfied when a plurality of polling signals is received in a nonconsecutive manner.

(Variant 2) In S140 of FIG. 4, the printer 10 may shift from the PM to the EWM after the polling period has elapsed since when the GN(PM)Res was sent from the server 100. In general terms, "set the operation mode of the communication device to a second mode instead of the first mode" may include setting the operation mode of the communication device to the second mode instead of the first mode after the first predetermined period has elapsed since when the specific polling signal has been sent.

(Variant 3) S124 of FIG. 4 may be omitted. In this case, the printer 10 changes its operation mode from the PM to the EWM in the case where the first predetermined condition is satisfied, regardless of a length of the polling period.

(Variant 4) S130 and S132 of FIG. 4 may be omitted. That is, the CPU 32 may proceed to S140 in the case of YES in S124. In general terms, the operation mode of the communication device may be set to the second mode instead of the first mode in the case where the communication device is capable of executing communication with the specific server using the proxy server.

(Variant 5) In S202 of FIG. 5, the printer 10 may resend the GN(EWM)Req in the case where the printer 10 does not receive the GN(EWM)Res. That is, the printer may determine that communication is unstable in the case where the printer does not receive the GN(EWM)Res from the server 100 despite having sent a plurality of GN(EWM)Req to the server 100. In a variant, not receiving the GN(EWM)Res despite having sent the plurality of GN(EWM)Req is an example of the "second predetermined condition". In another variant, S202 and S220 of FIG. 5 may be omitted. In this variant, "receive a predetermined signal" may be omitted.

(Variant 6) The "communication device" may not be a printer, and may be another device such as a scanner, a facsimile, a PC, a server, and the like. In the case where the scanner is the "communication device", a scan execution instruction is an example of the "target data". In the case where the PC is the "communication device", information contents on the Internet for example are examples of the "target data".

(Variant 7) The "related information" may not be the Job-ID, and may be the print data itself.

(Variant 8) S20 of FIG. 3 may be omitted. That is, the CPU 32 may proceed to S40 in the case of YES in S10 and in the case of YES in S60. In another variant, S40 of FIG. 3 may be omitted. That is, the CPU 32 may proceed to S30 in the case of YES in S20 while proceed to S50 in the case of NO in S20. In general terms, a method to determine whether the communication device is capable of executing communication with the specific server without using the proxy server is not limited to the method described in the embodiment.

(Variant 9) In the above embodiment, the respective processes of FIGS. 2 to 9 are implemented by the CPU 32 of the printer 10 executing the program 36. Instead, at least one of the processes may be realized by hardware such as a logic circuit.

What is claimed is:

1. A communication device comprising:
   a controller,
   wherein the controller is configured to:
   set an operation mode of the communication device to a first mode, the first mode being for repeatedly sending a polling signal to a specific server on the Internet so as to receive target data from the specific server;
   in a case where the polling signal is received by the specific server in a state where the specific server has the target data, receive a response including related information which is related to the target data from the specific server;
   in a case where the polling signal is received by the specific server in a state where the specific server does not have the target data, receive a response not including the related information from the specific server;
   in a case where a first predetermined condition is satisfied in a state where the operation mode of the communication device is the first mode, set the operation mode of the communication device to a second mode instead of the first mode, wherein the first predetermined condition corresponds to at least one time where at least one response not including the related information is received from the specific server, and the second mode is for receiving the target data from the specific server and not sending the polling signal to the specific server; and
   in a case where the target data is obtained by the specific server in a state where the operation mode of the communication device is the second mode, receive the related information from the specific server.

2. The communication device as in claim 1, wherein the first predetermined condition includes receiving M responses (M being an integer of 2 or greater) from the specific server in response to sending M polling signals to the specific server.

3. The communication device as in claim 2, wherein the first predetermined condition includes successively receiving the M responses from the specific server in response to successively sending the M polling signals to the specific server.

4. The communication device as in claim 1, wherein
the first mode is for repeatedly sending the polling signal to the specific server every time a first predetermined period elapses so as to receive the target data from the specific server, and
in a case where the first predetermined condition is satisfied due to receiving the response from the specific server in response to sending a specific polling signal to the specific server in the state where the operation mode of the communication device is the first mode, the controller is configured to set the operation mode of the communication device to the second mode instead of the first mode before the first predetermined period elapses since when the specific polling signal was sent.

5. The communication device as in claim 1, wherein
the first mode is for repeatedly sending the polling signal to the specific server every time a first predetermined period elapses so as to receive the target data from the specific server,
the first predetermined period is a period indicated by period information included in the response received from the specific server,
in a case where the first predetermined period is longer than or equal to a threshold value and the first predetermined condition is satisfied in the state where the operation mode of the communication device is the first mode, the controller is configured to set the operation mode of the communication device to the second mode instead of the first mode, and
in a case where the predetermined period is less than the threshold value in the state where the operation mode of the communication device is the first mode, the operation mode of the communication device is not set to the second mode instead of the first mode.

6. The communication device as in claim 1, wherein
in a case where the communication device is capable of executing communication with the specific server without using a proxy server and the first condition is satisfied in the state where the operation mode of the communication device is the first mode, the controller is configured to set the operation mode of the communication device to the second mode instead of the first mode, and
in a case where the communication device is capable of executing communication with the specific server by using the proxy server in the state where the operation mode of the communication device is the first mode, the operation mode of the communication device is not set to the second mode instead of the first mode.

7. The communication device as in claim 1, wherein
the controller is further configured to:
every time a second predetermined period elapses without the target data being obtained by the specific server in the state where the operation mode of the communication device is the second mode, receive a predetermined signal from the specific server,
wherein in a case where a second predetermined condition is satisfied in a state where the operation mode of the communication device is the second mode, the controller is configured to set the operation mode of the communication device to the first mode instead of the second mode, wherein the second predetermined condition includes not receiving at least one predetermined signal from the specific server.

8. The communication device as in claim 1, wherein
the communication device is a printer, and
the target data is image data representing an image to be printed.

9. A non-transitory computer-readable recording medium storing computer-readable instructions for a communication device, wherein
the computer-readable instructions, when executed by a processor of the communication device, cause the communication device to:
set an operation mode of the communication device to a first mode, the first mode being for repeatedly sending a polling signal to a specific server on the Internet so as to receive target data from the specific server;
in a case where the polling signal is received by the specific server in a state where the specific server has the target data, receive a response including related information which is related to the target data from the specific server;
in a case where the polling signal is received by the specific server in a state where the specific server does not have the target data, receive a response not including the related information from the specific server;
in a case where a first predetermined condition is satisfied in a state where the operation mode of the communication device is the first mode, set the operation mode of the communication device to a second mode instead of the first mode, wherein the first predetermined condition corresponds to at least one time where at least one response not including the related information is received from the specific server, and the second mode is for receiving the target data from the specific server and not sending the polling signal to the specific server; and
in a case where the target data is obtained by the specific server in a state where the operation mode of the communication device is the second mode, receive the related information from the specific server.

* * * * *